April 11, 1950 V. E. PRATT ET AL 2,503,453
TAKE-UP REEL SYSTEM
Filed Aug. 30, 1945 2 Sheets-Sheet 1

INVENTOR.
VERNEUR E. PRATT.
GEORGE F. GRAY.
BY *Van Deventer & Grier*
ATTORNEYS.

April 11, 1950

V. E. PRATT ET AL 2,503,453

TAKE-UP REEL SYSTEM

Filed Aug. 30, 1945

INVENTOR.
VERNEUR E. PRATT.
GEORGE F. GRAY.
BY
*Van Deventer & Grier*
ATTORNEYS.

Patented Apr. 11, 1950

2,503,453

UNITED STATES PATENT OFFICE 2,503,453

TAKE-UP REEL SYSTEM

Verneur E. Pratt and George F. Gray,
Norwalk, Conn.

Application August 30, 1945, Serial No. 613,650

14 Claims. (Cl. 242—76)

This invention relates to improvements in take-up reel systems, and has for a principal object the provision of a take-up reel system in which the reel automatically engages the free end of a film delivered thereto. Such an arrangement is particularly useful in film processors where the free end of the film is delivered to the reel and the reel engages the same and continues to take-up, or reel on, the film, or in any other system employing film, thereby making it unnecessary to manually place the end of the film in engagement with the take-up reel.

This application is a continuation-in-part of our copending application Serial Number 507,938, filed October 28, 1943, for Methods and apparatus for automatically processing film, now Patent No. 2,428,681, dated October 7, 1947.

One embodiment of the invention contemplates the provision of the take-up heel with hooks or other film engaging members extending radially from the center of the hub of the reel, and the provision of a film conveyor which initially engages the hub of the reel yieldably. By this arrangement the end of the film, which is provided with several perforations adapted to be engaged by said hooks, upon being guided to said hub, has at least one of said perforations engaged by at least one of said hooks (a clearance path for the hooks being provided in at least that portion of the film conveying means which normally contacts the reel hub), and the reel starts taking the film up. Now, as the film builds up on the reel, the film conveyor, since it is yieldably engaging the hub, is moved or displaced, and means is provided for completely disengaging it from between the side members of the reel when it is desired to remove the reel from the take-up shaft.

A modification of this arrangement contemplates making the film conveyor fixed and the take-up shaft and the reel yieldably engage the conveyor, and as the end of the film is hooked and the film builds up on the reel, the reel is moved bodily away from the conveyor.

Referring to the drawings, which are given by way of example to illustrate the embodiments referred to above:

Figure 1:
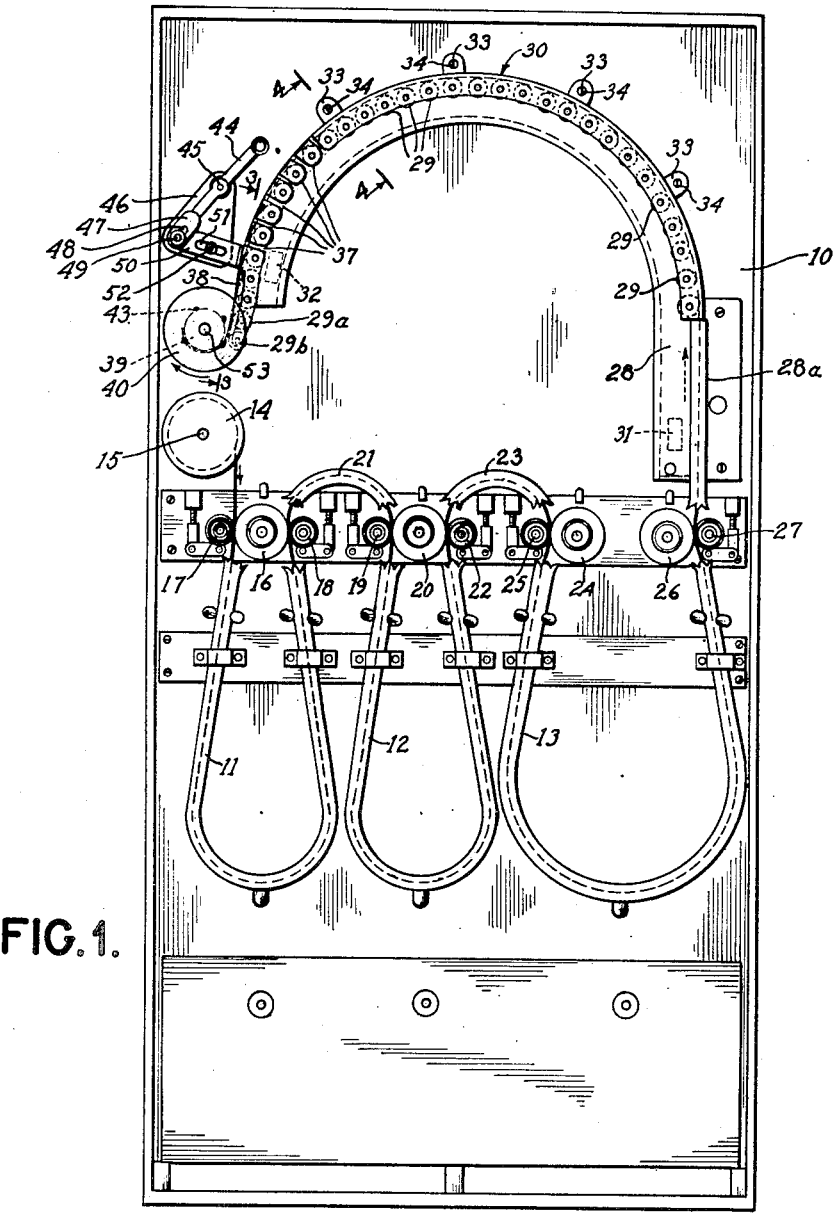
Figure 1 is an elevational view of the film processor described in the aforesaid copending application, and showing the film take-up reel system which receives and takes up the film as it leaves the dryer in said processing apparatus.
Figure 2:
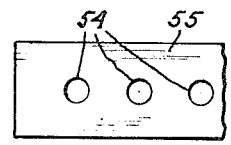
Figure 2 is a view showing perforations in the end of the film adapted to be engaged by the take-up reel.

Referring first to Figure 1, a vertical support 10 carries U-shaped conduits 11, 12 and 13. Processing fluids are circulated through the conduits 11 and 12, and washing water is circulated through the conduit 13. A reel 14 of exposed film is positioned on a spindle 15 and the free end of the film is inserted between rollers 16 and 17 of a film conveyor system, and these rollers push the film through the conduit 11 and it enters between the roller 16 and a roller 18. The film is deflected toward rollers 19 and 20 by a curved guide member 21, and it is delivered by these rollers to the conduit 12.

As the film leaves the conduit 12, it is engaged between the rollers 20 and 22 and is guided by the curved deflector 23 between rollers 24 and 25, which deliver it to the conduit 13. As the film leaves the conduit 13, it is engaged by rollers 26 and 27, and is pushed up through a dryer 28. The dryer 28 may consist of a short section of duct 28ª surrounding the film where it emerges from the last feed roller. The film then passes over a plurality of rollers 29 supported in a curved flexible metallic track member generally designated by the numeral 30 to be presently described, and forming an arcuate drying track for the film. This track may be enclosed by a casing (which is omitted for the sake of clarity) forming a duct whereby air may be confined in contact with the film and circulated about the film to dry it as it passes therethrough. An entrance duct 31 and an exit duct 32 are provided for the air.

Figure 4:
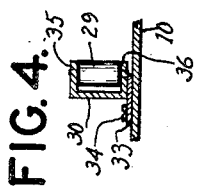
Figure 4 is a sectional elevation taken along the line 4—4 of Figure 1.

Part of the curved track 30 is fixed and may be secured to the support 10 by means of brackets 33 with screws 34 passing therethrough and engaging the support 10. The left end of the curved track member is flexible due to the fact that the sides 35 and 36 (Figure 4) of the channel member 30 are cut away as shown at 37 in Figure 1. Near the end, beginning at the point 38, Figure 1, the web is cut away, leaving the side members 35 and 36 of the channel supporting the rollers, thereby making the rollers accessible to the hub 39 of the reel 40. The rollers 29ª and 29ᵇ at the reel end of the track are provided with grooves 41 and 42, respectively, to clear the hooks 43 carried in the hub 39 of the reel 40. A hand lever 44 is free to move about a shouldered screw 45 secured to a bracket 46. The end 47 of the lever is slotted as shown at 48. A pin 49 passes through this slot and is secured to an arm 50 which has a slot 51 through which a pin 52 mounted on the bracket 46 extends. The arm 50 is secured to the channel 30 as shown, and thereby the arm 50 serves as a slidable support for the flexible portion of the curved track 30.

The reel 40 is mounted on a take-up shaft 53 which may be driven in the usual manner, as the driving of the reel forms no part of the present invention.

The end of the film, or a leader attached to the film, may have formed therein near the end thereof a series of holes, such as the holes 54 shown in the film 55.

Returning to Figure 1, as the free end of the film or leader approaches the end of the curved track, at least one of the hooks or members 43 carried in the hub of the reel engages at least one of the holes 54 formed in the film or leader, and the film starts taking up. Now, as the film builds up on the reel 40, the flexible end of the track 30 is displaced to the right as seen in Figure 1. When all of the film is taken up on the reel 40 it may be removed from the spindle 53 by swinging the lever 44 in a counterclockwise direction, thereby further displacing the end of the flexible portion of the track 30 so that it clears the sides of the reel 40 following which the reel may be pulled off of the spindle endwise.

Figure 5:
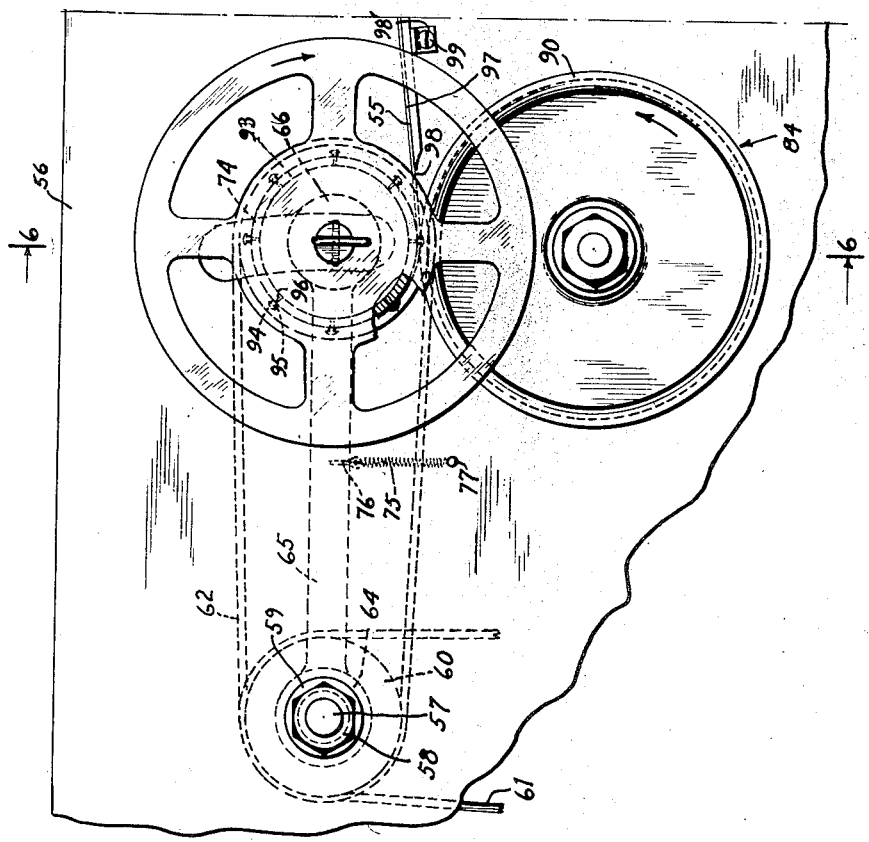
Figure 5 is an elevation of a take-up reel system in which the hub of the reel yieldably engages a rotary film guide and moves away from the same as the film builds up thereon.
Figure 6:
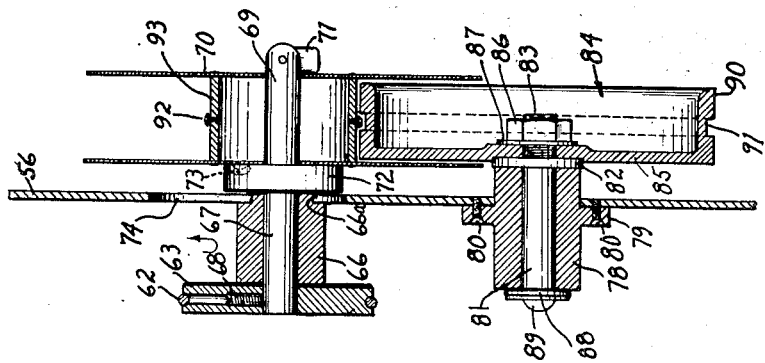
Figure 6 is a sectional elevation taken along the line 6—6 of Figure 5.
Figure 3:
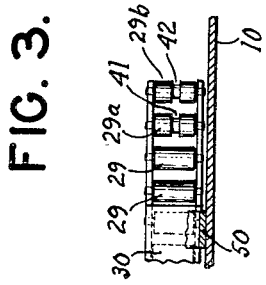
Figure 3 is a view of a portion of the film conveyor taken along the line 3—3 of Figure 1.

In the modification shown in Figures 5 and 6, a vertical support 56 carries a stud 57 which is secured thereto by a nut 58 and washer 59, and journalled on this stud is a double grooved pulley 60 which may be driven by a belt 61 from pulley (not shown) driven by a prime mover. The double pulley 60 also carries a belt 62 which drives a pulley 63. Also journalled on the stud 57 is a boss 64 having an arm 65 formed integral therewith and the arm 65 has formed integral therewith on its other end a boss 66.

The boss 66 has a hole formed therein, and journalled in this hole is a shaft 67 upon one end of which is mounted the grooved pulley 63. This pulley may be secured to the shaft 67 in any suitable manner, for example by means of a set screw 68.

An extension 69 of the shaft 67 forms a spindle for a take-up reel 70 and the end of the spindle 69 may carry a pivoted retainer 71 for the reel. Between the shaft 67 and the spindle 69, and preferably formed integral therewith, is a portion 72 of larger diameter forming a shoulder which bears against the right end 66ª of the boss 66, as seen in Figure 6, and against which the reel 70 bears. This portion may carry a reel keying device 73 such as is disclosed in copending application Serial Number 593,888, filed May 15, 1945.

The right end 66ª of the boss 66 is of reduced diameter and projects into an arcuate slot 74 formed in the support 56. This arcuate slot permits the arm 65 to be swung about the stud 57 and, since the arcuate path of the pulley 63 is concentric with the stud 57, the tension of the belt 62 is not changed by this movement.

A spring 75 has one end secured to a pin 76 carried by the arm 65, and its other end is secured to a pin 77 mounted in the support 56. This spring urges the arm in a clockwise direction as seen in Figure 5.

A bearing boss 78 is provided with a flanged portion 79 and this boss extends through a hole in the support 56 and is secured to said support by means of screws 80 passing through the flanged portion 79 and engaging the support 56. Journalled in the boss 78 is a shaft 81 which has a flange portion 82 bearing against the right end of the bearing boss 78, as seen in Figure 6. The shaft 81 carries a threaded portion 83 upon which is mounted a roller 84. A web portion 85 of the roller fits on the shaft portion 83 and is secured thereon by means of a nut 86 and a washer 87 therebetween. The left end of the shaft 81 is engaged by a screw 89 and this screw bears against a washer 88 which in turn bears against the left end of the boss 78. The rim 90 of the roller 84 has an annular groove 91 formed therein, and this groove forms a clearance for the hook members 92 carried in a hub 93 of the reel 70. The hook members 92 have heads 94 which are larger in diameter than the shank portions 95.

Formed integrally with the shank portion is a portion 96 of reduced diameter which extends through a suitable hole in the hub 93 and is riveted therein. A film conveyor 97 terminates at a point 98 adjacent to the meeting point of the hub 93 and the rim 90 of the roller 84 and is supported on the support 56, for example by means of brackets, one of which is shown at 98', which are in turn secured to the support by means of screws 99.

As the end of the film 55 is delivered between the hub of the take-up reel and the free roller 84, at least one of the hook members 94, 95 engages at least one of the holes 54 formed in the end of the film (or leader) and the reel starts taking up the film. As the film builds up on the reel it, acting against the free roller 84, causes the reel to be displaced upwardly, and since the reel spindle is supported in the boss 66 on the arm 65, the reel rises on an arcuate path within the arcuate slot 74.

When it is desired to remove the reel from the spindle 69, the retaining member 71 is swung to a position axial with the spindle 69, the reel is swung upwardly to the upper limit of the arcuate slot 74 where the reel clears the free roller 84, and the reel may be withdrawn endwise from its spindle.

In placing a new reel on the spindle, the spindle is raised up to substantially the same position above described, and the reel is placed thereon, the retainer 71 is swung downwardly and the reel is allowed to move downwardly until its hub 93 contacts its free roller, and the reel is ready to receive the next film.

Although we have herein shown and described, by way of example, an embodiment of the invention and a modification thereof, it is obvious that many changes may be made in the arrangement herein shown and described without departing from the spirit of the invention as set forth in the annexed claims.

What is claimed is:

1. In a film take-up reel system, a spindle, a reel element removably mounted on said spindle and carrying engaging members on its hub, a support element for conveying film to said hub, said support carrying roller means, resilient means urging said hub and said roller means into contact with one another, said film having perforations formed therein adapted to be engaged by said engaging members, at least one of said elements being moved relative to the other by the film as it builds up on said reel.

2. In a film take-up reel system, a spindle, a reel element removably mounted on said spindle and carrying a plurality of engaging members on its hub, a support element for conveying film to said hub, said support having journaled therein roller means adapted to contact said hub on at least one side of said engaging members, spring means urging said roller means and said hub into rolling engagement with each other, said film having perforations formed therein adjacent to the end thereof adapted to be engaged by said engaging members, at least one of said elements being movably positioned relative to the other, whereby said film as it builds up on said reel displaces said movable element.

3. In a film take-up reel system, a take-up spindle, a reel element mounted on said spindle and carrying a plurality of radial engaging members on its hub, a support element for conveying film to said hub, said support element including at least one free roller and having a groove formed therein adapted to clear the engaging members on said hub, means urging said free roller and said hub into frictional contact with each other, said film having perforations formed therein adjacent to the end thereof adapted to be engaged by said engaging members, one of said elements being movably positioned relative to the other, whereby said film as it is engaged by at least one of said members builds up on said reel and displaces said movable element.

4. In a film take-up reel system, a support, a take-up spindle and means to drive the same, a reel element mounted on said spindle and carrying a hub, a plurality of radial engaging members disposed in alignment on said hub, a support element for conveying film to said hub, said support element including at least one free roller normally in contact with said hub and having a groove formed therein to clear said engaging members, means urging said roller and said hub to effect said contact, said film having perforations formed therein adjacent to the end thereof, at least one of which is adapted to be engaged by one of said engaging members, one of said elements being movably positioned on said support relative to the other, whereby said film after it is engaged, as aforesaid, builds up on said hub and displaces said movably positioned element.

5. In a film take-up reel system, a reel and means to drive the same, said reel having a hub carrying engaging members for engaging perforations formed adjacent the end of said film, and means for delivering film to said reel with said perforations in the path of said engaging members, said last means carrying a grooved roller adapted to be contacted by the hub of said reel, means urging said reel into contact with said grooved roller, said reel being moved away from said last mentioned means as the film builds up thereon.

6. In a film take-up reel system, a support, a take-up spindle movably carried on said support, a reel element mounted on said spindle and carrying a plurality of radial engaging members on its hub, a conveyor for delivering film to said hub, said conveyor including a free roller having a groove formed therein clearing the engaging members on said hub when said roller is in contact with said hub, means urging said hub into contact with said roller, said film having perforations formed therein adjacent to the end thereof to be engaged by said engaging members, said spindle and the reel carried thereon being moved away from said roller as said film builds up on said reel.

7. In a film take-up reel system, a vertical support, a take-up spindle movably carried on said support, means to drive said spindle, a fixed shaft carried on said support, a free roller carried on said shaft, said free roller having an annular groove formed therein, a reel positioned on said spindle and driven thereby, said reel having a hub with a plurality of hooks extending radially therefrom, said hub being normally in contact with said free roller and said annular groove forming the clearance for said hooks, a film guide member mounted on said support and extending toward the normal line of contact between said hub and said roller, said film having perforations formed therein adjacent to the end thereof to be engaged by one of said hooks, whereby said film, after it is engaged as aforesaid, builds up on said hub and displaces said reel and said spindle.

8. In a web take-up reel system, a reel element and means to drive the same, said reel element having a hub carrying engaging means adapted to engage perforations formed adjacent the end of said web, and a conveyor element for delivering said web to said reel with said perforations in the path of said engaging members, said conveyor element carrying a grooved free roller normally maintained in contact with said hub and with the groove therein clearing said engaging means, at least one of said elements being moved away from the other as the web builds up on said reel element.

9. In a film take-up reel system, a vertical support, a take-up spindle extending from the face of said support, means to drive said spindle, a reel positioned on said spindle and driven thereby, said reel having a hub, a plurality of hooks disposed in alignment on said hub, a track member mounted on said support for delivering film to said hub, said track member being at least in part flexible, and a plurality of free rollers rotatably supported in said track member, at least one of said rollers in said flexible portion having an annular clearance groove formed therein to clear said hooks when it is normally in contact with said hub, said film having perforations formed therein adjacent to the end thereof to be engaged by at least one of said hooks, whereby said film, after it is engaged as aforesaid, builds up on said hub and displaces said grooved roller.

10. In a film take-up reel system, a vertical support, a take-up spindle carried in said support and extending from the face thereof, means to drive said spindle, a reel positioned on said spindle and driven thereby, said reel having a hub, a plurality of hooks extending radially from and in alignment on said hub, a track member mounted on said support and having one end thereof flexibly carried on said support, a plurality of rollers rotatably supported in said track member, at least one of said rollers at the end of said flexible portion having an annular clearance groove formed therein to clear said hooks when it is normally in contact with said hub, said film having perforations formed therein adjacent to the end thereof to be engaged by at least one of said hooks, whereby said film, after it is engaged as aforesaid, builds up on said hub and displaces said grooved roller.

11. In a film take-up reel system, a vertical support, a take-up spindle carried in said support and extending from the face thereof, means to drive said spindle, a reel positioned on said spindle and driven thereby, said reel having a hub, a plurality of hooks extending radially from and in alignment on said hub, a track member mounted on said support and having one end thereof flexibly carried on said support, said track member being in the form of a channel and the portion adjacent to said last mentioned end having portions of the sides of the channel cut away down to the web therebetween, a plurality of rollers rotatably supported in aligned holes formed in the sides of the channel forming said track member and having their surfaces substantially parallel to the central web of said channel, at least one of said rollers at the end of said flexible portion having an annular clearance groove formed therein to clear said hooks when it is normally in contact with said hub, said film having perforations formed therein adjacent to the end thereof to be engaged by at least one of said hooks, whereby said film, after it is engaged as aforesaid, builds up on said hub and displaces said grooved roller.

12. In a film take-up reel system, a spindle, a reel and means to drive the same removably mounted on said spindle, said reel having a hub carrying engaging members adapted to engage perforations formed adjacent the end of said film whereby said film is engaged and wound on said reel so as to be removable from said spindle therewith, and means for delivering film to said reel with said perforations in the path of said engaging members, said reel being adapted to move away from said means as the film builds up on the reel.

13. In a film take-up reel system, a support, a shaft fixed on said support, an arm having one end journaled on said shaft and extending radially therefrom, a spindle journaled in the other end of said arm, a reel element mounted on said spindle and carrying a plurality of radial engaging members on its hub, means for driving said spindle, a second shaft on said support in spaced relation to said first shaft, a free roller journaled on said second shaft and having a groove formed therein clearing the engaging members on said hub when said roller is contacted by said hub, means urging said hub into contact with said roller, and a conveyor for delivering film between said roller and said hub, said film having perforations formed therein adjacent to the end thereof to be engaged by said engaging members, said spindle and the reel carried thereon being moved away from said roller as said film builds up on said reel.

14. In a film take-up reel system, a vertical plate forming a support, a shaft fixed on said support and extending rearwardly therefrom, an arm behind said support and having one end journaled on said shaft and extending radially therefrom, a spindle journaled in the other end of said arm and extending through an elongated opening formed in said support, a reel element mounted on said spindle in front of said support and carrying a plurality of radial engaging members on its hub, means for driving said spindle, a second shaft on said support in spaced relation to said first shaft and extending from the front of said support, a free roller journaled on said second shaft, said roller being positioned to have at least one point on its periphery contacted by said hub and having a groove formed therein clearing the engaging members on said hub when said roller is contacted by said hub, spring means secured to said support and to said arm for urging said arm in a direction to bring said hub into contact with said roller, and a conveyor for delivering film between said roller and said hub, said film having perforations formed therein adjacent to the end thereof to be engaged by said engaging members, said spindle and the reel carried thereon being moved away from said roller as said film builds up on said reel.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 781,927 | Adams | Feb. 7, 1905 |
| 1,225,184 | Segel | May 8, 1917 |
| 1,346,356 | Wenderhold | July 13, 1920 |
| 1,825,142 | Bruno | Sept. 29, 1931 |
| 1,871,715 | May | Aug. 16, 1932 |
| 1,958,068 | Raiche | May 8, 1934 |
| 2,053,022 | Corswandt et al. | Sept. 1, 1936 |